(Model.)

G. G. SNYDER.
HORSESHOE BLOCK.

No. 314,890. Patented Mar. 31, 1885.

WITNESSES:
J. W. Reynolds
Edward C. Ellis

INVENTOR
George G. Snyder
BY O. E. Duff
ATTORNEY

UNITED STATES PATENT OFFICE.

GEORGE G. SNYDER, OF MIDDAGHS, PENNSYLVANIA.

HORSESHOE-BLOCK.

SPECIFICATION forming part of Letters Patent No. 314,890, dated March 31, 1885.

Application filed February 18, 1884. (Model.)

*To all whom it may concern:*

Be it known that I, GEORGE G. SNYDER, of Middaghs, in the county of Northampton and State of Pennsylvania, have invented certain new and useful Improvements in Horseshoe-Blocks; and I do hereby declare that the following is a full, clear, and exact description of the invention, which will enable others skilled in the art to which it appertains to make and use the same, reference being had to the accompanying drawings, and to the letters of reference marked thereon, which form part of this specification.

Previous to my present invention frequent mishaps have occurred in the operation of tread-powers by rough-shod horses, owing to the catching of the shoes between the transverse slats or rods and lags of the machine, or when the distance between the toe and calks is equal to the width of the lags, as sometimes happens, to the wedging down of the shoes over the surface and edges of the lags. When this occurs after the power has attained a great velocity, the result is that the shoe is either torn from the hoof and carried on, breaking the machinery, or in some instances the leg is broken or the entire hoof torn off, necessitating the subsequent killing of the animal.

The object of my invention is to provide a supplemental shoe which may be attached to a horse's hoof, and which, when attached, shall extend between the toe and heel calks of the ordinary shoe, and raise the calks sufficient to prevent them from extending too far beneath the tops of the lags and catching between them, and also to provide such a supplemental shoe as will raise the heel of the horse's hoof sufficient to give the foot substantially a horizontal bearing; and for that purpose it consists of the parts hereinafter described, reference being had to the accompanying drawings, in which—

Figure 1:
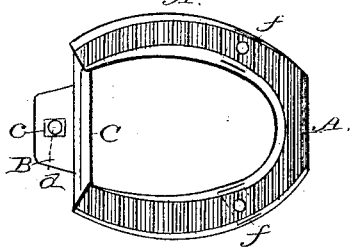
Figure 2:
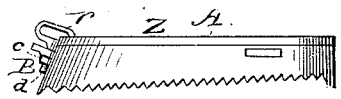
Figure 3:
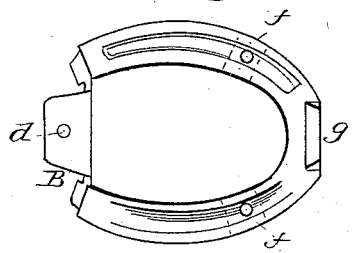
Figure 4:
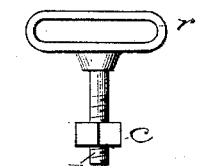
Figure 5:
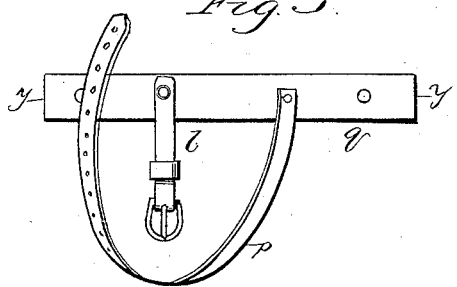
Figure 6:
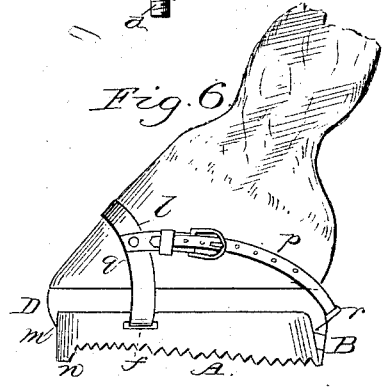
Figure 7:
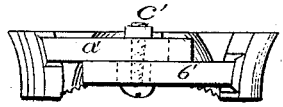
Figure 8:
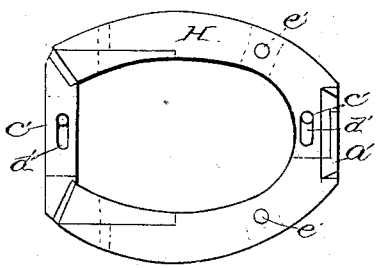

Figure 1 represents a bottom plan view of my improved horse-block; Fig. 2, a side view, Fig. 3 a top view, and Fig. 4 a detail, of the same, showing the means of fastening the heel-strap. Fig. 5 is a detail showing the fastening-strap. Fig. 6 shows my invention as applied to a rough-shod hoof. Figs. 7 and 8 are respectively an end elevation and a top plan view of a modification.

In Figs. 7 and 8 $a'$ and $b'$ are slotted bars which slide upon each other, and are slotted, as shown by $d'$ in Fig. 8. The sides of the supplemental shoe are secured at any desired distance from each other by the set-screw $c'$.

H H are the sides of the shoe.

In the several figures, A represents my improved horseshoe-block, which may be made of any suitable material, such as malleable, cast, or wrought iron, leather, rubber, hard paper, and the like. It is made of a shape conforming to an ordinary horseshoe, and is provided with a top groove, $z\ z$, for the reception of the heads of the nails projecting beyond the nail-groove of the shoe. At its rear or heel end the block is provided with a connecting-piece, $e$, cast integrally therewith, and having a projecting back lug, B. The lug is perforated centrally, and in this perforation is secured the pin $d$, provided with loop-head $r$, and held in place by the retaining-nut $c$. The block is preferably made with a series of tooth-like projections, so as to insure sufficient frictional contact with the smooth surface of the lags. Instead of these teeth, however, it may be cast with very small rough calks. At the toe it is provided with a small calk; or, if desired, it may be made without such calk and of much lesser thickness at the toe, so that the calk of the shoe proper will project down and below the under side of the block-toe. In each side of the block are arranged the longitudinal slits $f\ f$, for the reception of the outer ends, $y\ y$, of a band-strap, $q$, the ends being fastened in such slits by means of retaining-rivets. To the strap $q$ are secured the buckle-strap $l$ and perforated strap $p$. The latter is intended to pass through the heel-loop $r$, and, together with the others, secures the block in position between the toe and heel calks of the shoe, as shown in Fig. 6.

It will be observed that the block slopes from heel to toe. The result of this construction is that the hoof is thrown out almost level and given a direct bearing upon the lags, thereby obviating the tendency of the toe or heel calks to enter between the lags or lags and rods.

In order to facilitate the attachment of this device to shoes of different sizes, it may be made adjustable, as shown in Figs. 7 and 8. In Fig. 8 the part H is moved to and from the part I, or vice versa, by means of the slots $d'$ $d'$ in the ends of said parts, said slots being formed in the extremities of the parts H and I, which extremes are also correspondingly recessed to allow them to be slid upon each other, as shown in Figs. 7 and 8.

Having determined the size of the shoe, and having adjusted the parts to any desired position, they are secured in place by means of set screws or bolts $c'$ $c'$.

Having thus described my invention, what I claim is—

A supplemental horseshoe constructed with a rough beveled tread-surface, combined with a permanent shoe and with the described fastening device, consisting of strap $l$ at the toe, and strap $p$ passing through the adjustable loop $r$ at the heel of the shoe and connected with the strap $l$, substantially as set forth.

In testimony that I claim the foregoing as my own I affix my signature in presence of two witnesses.

GEORGE G. SNYDER.

Witnesses:
JOS. U. BROWN,
C. B. HETRICH.